(12) United States Patent
Kim et al.

(10) Patent No.: US 12,217,185 B2
(45) Date of Patent: Feb. 4, 2025

(54) METHOD AND APPARATUS OF INCREASING KNOWLEDGE BASED ON UNCERTAINTY IN NEURAL NETWORKS

(71) Applicant: Electronics and Telecommunications Research Institute, Daejeon (KR)

(72) Inventors: Hyun Woo Kim, Daejeon (KR); Jeon Gue Park, Daejeon (KR); Hwa Jeon Song, Daejeon (KR); Yoo Rhee Oh, Daejeon (KR); Byung Hyun Yoo, Daejeon (KR); Eui Sok Chung, Daejeon (KR); Ran Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 924 days.

(21) Appl. No.: 17/332,464

(22) Filed: May 27, 2021

(65) Prior Publication Data

US 2021/0374545 A1    Dec. 2, 2021

(30) Foreign Application Priority Data

May 29, 2020    (KR) ......................... 10-2020-0065489

(51) Int. Cl.
| | |
|---|---|
| *G06N 3/082* | (2023.01) |
| *G06F 40/35* | (2020.01) |
| *G06N 3/042* | (2023.01) |
| *G06N 5/022* | (2023.01) |
| *G06N 5/043* | (2023.01) |

(52) U.S. Cl.
CPC ............. *G06N 3/082* (2013.01); *G06F 40/35* (2020.01); *G06N 3/042* (2023.01); *G06N 5/022* (2013.01); *G06N 5/043* (2013.01)

(58) Field of Classification Search
CPC ........ G06N 3/082; G06N 3/042; G06N 5/022; G06N 5/043; G06F 40/35
See application file for complete search history.

(56) References Cited

U.S. PATENT DOCUMENTS

| | | |
|---|---|---|
| 2015/0100455 A1 | 4/2015 | Kitou et al. |
| 2018/0189655 A1 | 7/2018 | Oh et al. |

(Continued)

FOREIGN PATENT DOCUMENTS

| | | |
|---|---|---|
| KR | 10-1787611 | 10/2017 |
| WO | 2017/119997 | 7/2017 |

OTHER PUBLICATIONS

Ding et al. "Incorporating Uncertainties in Student Response Modeling by Loss Function Regularization", Preprint submitted to Neurocomputing, May 27, 2020, pp. 17.*

(Continued)

*Primary Examiner* — Li Wu Chang
(74) *Attorney, Agent, or Firm* — KILE PARK REED & HOUTTEMAN PLLC

(57) ABSTRACT

A knowledge increasing method includes calculating uncertainty of knowledge obtained from a neural network using an explicit memory, determining the insufficiency of the knowledge on the basis of the calculated uncertainty, obtaining additional data (learning data) for increasing insufficient knowledge, and training the neural network by using the additional data to autonomously increase knowledge.

15 Claims, 10 Drawing Sheets

(56) References Cited

U.S. PATENT DOCUMENTS

| | | |
|---|---|---|
| 2018/0189679 A1 | 7/2018 | Kang et al. |
| 2019/0251184 A1* | 8/2019 | Shan ...................... G06N 3/045 |
| 2020/0086862 A1 | 3/2020 | Cui et al. |
| 2021/0012156 A1* | 1/2021 | Vijaykeerthy ......... G06N 3/084 |

OTHER PUBLICATIONS

Lakshminarayanan et al. "Simple and Scalable Predictive Uncertainty Estimation using Deep Ensembles", NIPS, 2017, pp. 15.*

Deepak Pathak et al., "Curiosity-driven Exploration by Self-supervised Prediction", Proceedings of the 34th International Conference on Machine Learning. arXiv:1705.05363v1 [cs.LG], Aug. 2017, 12 pages.

H.J. Song, et al., "Self-Improving Artificial Intelligence Technology", ETRI Electronics and Telecommunications Trends, 34-4, Aug. 2019.

* cited by examiner

FIG. 3

| PREVIOUSLY GENERATED FASHION COORDINATION KNOWLEDGE | | | | |
|---|---|---|---|---|
| PREVIOUSLY GENERATED ANSWER | "WHAT STYLE OF SKIRT DO YOU WANT?" | | | |
| QUERY | "PLEASE RECOMMEND BRIGHT-COLOR PLEATED SKIRT AS IN PHOTOGRAPH" | | | |

FIG. 4

| PREVIOUSLY GENERATED FASHION COORDINATION KNOWLEDGE | [0.19142, -0.8315, 1.2467, ..., -1.4377, -3.2516, 1.2932] |
|---|---|
| PREVIOUSLY GENERATED ANSWER | [3.1246, 2.5673, -2.3562, ..., 0.9482, 0.5945, 2.7493] |
| QUERY | [2.9394, 1.4567, -0.3486, ..., -2.0013, 1.5367, -18972] [0.6120, -0.8824, -1.3063, ..., -2.8072, -7.1438, 0.7296] |

AFTER DROPOUT IS APPLIED

METHOD AND APPARATUS OF INCREASING KNOWLEDGE BASED ON UNCERTAINTY IN NEURAL NETWORKS

CROSS-REFERENCE TO RELATED APPLICATIONS

This application claims priority under 35 U.S.C. § 119 to Korean Patent Application No. 10-2020-0065489, filed on May 29, 2020, the disclosure of which is incorporated herein by reference in its entirety.

TECHNICAL FIELD

The present invention relates to technology for increasing knowledge based on knowledge in neural networks.

BACKGROUND

An artificial intelligence (AI) agent may be used as the term that denotes a software module (or a program) for autonomously increasing knowledge through an interaction with other persons and a hardware module equipped with the software module, and for example, there may be a general neural network or a deep learning-based neural network.

The deep learning-based neural network is a machine learning algorithm that attempts to realize a high-level abstraction from data by using an input/output layer similar to a neuron of brain.

A deep learning-based neural network of the related art does not have a function of autonomously determining the insufficiency of knowledge and increasing knowledge through learning of insufficient knowledge.

Therefore, in order for an AI agent such as a neural network to autonomously learn insufficient knowledge, a user should directly construct data (for example, training data, etc.) for learning of insufficient knowledge, but much time and cost are spent in constructing data.

SUMMARY

Accordingly, the present invention provides a knowledge increasing method and apparatus in which an AI agent autonomously determines insufficient knowledge and autonomously samples (generates or obtains) additional data for learning the determined insufficient knowledge to learn insufficient knowledge on the basis of the sampled (generated or obtained) additional data, thereby increasing knowledge autonomously.

In one general aspect, a method of increasing knowledge based on uncertainty of a neural network in an artificial intelligence (AI) agent, programmed and executed by a computing device to include a knowledge generating neural network for generating knowledge about a user query and a dialogue generating neural network for generating an answer to the user query on the basis of the knowledge, includes: converting each of a current user query, previous knowledge generated by the knowledge generating neural network, and a previous answer, generated by the dialogue generating neural network, into an embedding vector value having a specific dimension by using a complex modal expression unit; calculating a plurality of output values corresponding to the embedding vector value by using the knowledge generating neural network with a dropout technique applied thereto and calculating uncertainty of the knowledge generating neural network on the basis of the calculated plurality of output values by using the uncertainty calculator; and searching for a database on the basis of the calculated uncertainty to obtain learning data and training the knowledge generating neural network and the dialogue generating neural network on the basis of the obtained learning data to increase knowledge by using the self-sampling unit.

In another general aspect, a knowledge increasing apparatus includes: a storage configured to store an artificial intelligence (AI) agent programmed to include a knowledge generating neural network for generating knowledge about a user query and a dialogue generating neural network for generating an answer to the user query on the basis of the knowledge; and a processor configured to execute the AI agent stored in the storage, wherein the AI agent includes: a data preprocessing unit configured to convert each of a current user query, previous knowledge generated by the knowledge generating neural network, and a previous answer, generated by the dialogue generating neural network, into an embedding vector value having a specific dimension; an uncertainty calculator configured to calculate a plurality of output values corresponding to the embedding vector value by using the knowledge generating neural network with a dropout technique applied thereto and to calculate uncertainty of the knowledge generating neural network on the basis of the calculated plurality of output values; and a self-sampling unit configured to perform linear conversion on the calculated uncertainty to calculate a compensation value, obtain learning data having the calculated compensation value from a database built through unsupervised learning, and train the knowledge generating neural network and the dialogue generating neural network on the basis of the obtained learning data to increase knowledge.

Other features and aspects will be apparent from the following detailed description, the drawings, and the claims.

BRIEF DESCRIPTION OF THE DRAWINGS

FIG. 3 is a diagram illustrating an example of a query about fashion coordination knowledge, a previously generated answer, and previously generated knowledge according to an embodiment of the present invention.

FIG. 4 is a diagram illustrating an example of an embedding vector obtained by performing embedding on each of the query, the previously generated answer, and the previously generated knowledge illustrated in FIG. 3.

DETAILED DESCRIPTION OF EMBODIMENTS

Figure 1:
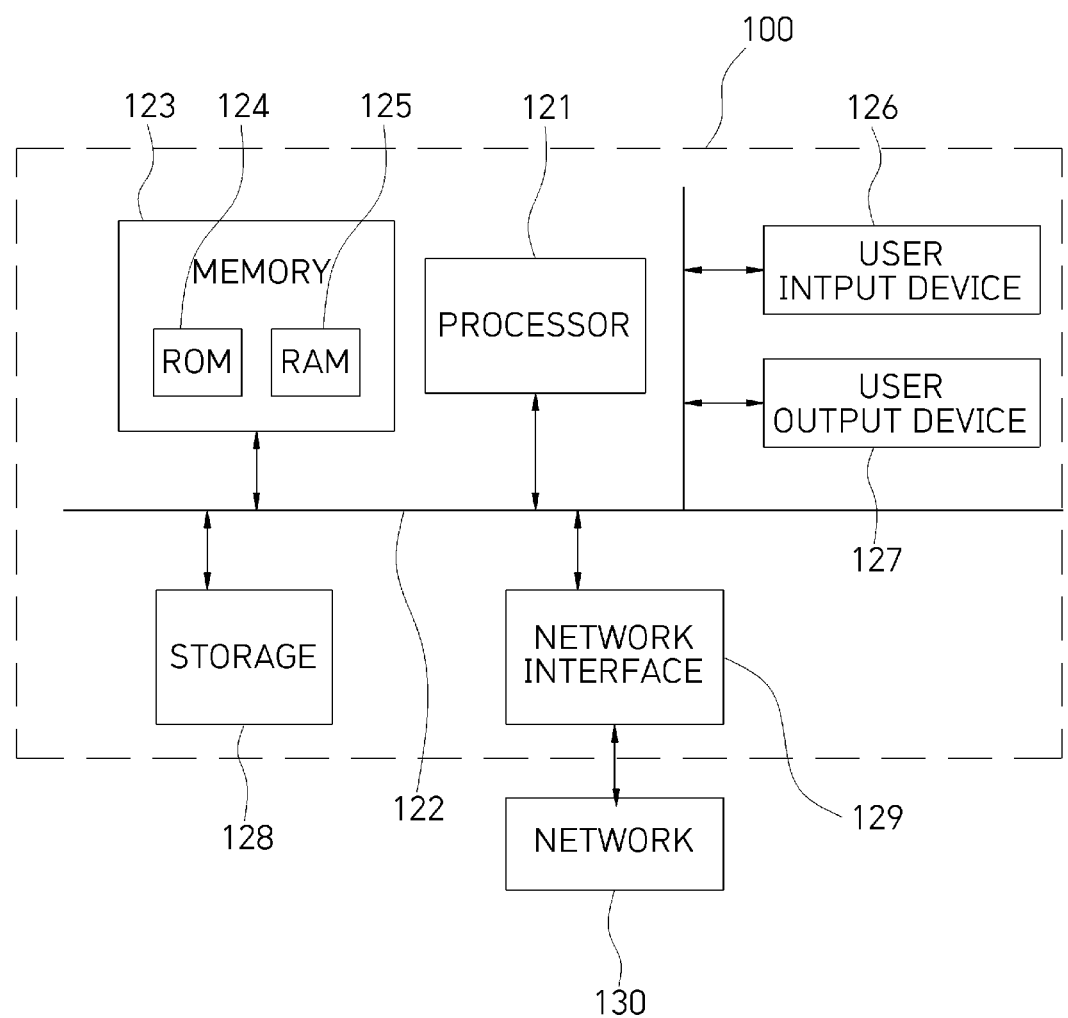
FIG. 1 is a block diagram of a computing device for implementing a knowledge increasing method according to an embodiment of the present invention.

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In various embodiments of the disclosure, the meaning of 'comprise', 'include', or 'have' specifies a property, a region, a fixed number, a step, a process, an element and/or a component but does not exclude other properties, regions, fixed numbers, steps, processes, elements and/or components.

An AI agent according to an embodiment of the present invention may determine a demand of a user on the basis of a query, a previous answer to the query, and previous knowledge about the query through a neural network using an explicit memory and may generate a dialogue and knowledge suitable for the demand.

Also, the AI agent according to an embodiment of the present invention may calculate the uncertainty of the generated knowledge, autonomously determine insufficient knowledge, autonomously sample (generate) additional data for learning the determined insufficient knowledge, and perform learning on the insufficient knowledge (unknown knowledge) on the basis of the sampled (generated) additional data, thereby increasing knowledge autonomously.

Here, sampling (or data sampling) may be a data processing process which reads relevant data in a knowledge database previously built based on unsupervised learning, or searches for a new search space like reinforcement learning.

As described above, the AI agent according to an embodiment of the present invention may autonomously sample (generate) additional data for learning insufficient knowledge, and thus, may considerably decrease cost and time which are spent in a process of directly constructing, by a user, additional data (for example, training data) for performing learning on insufficient knowledge like an AI agent of the related art.

Hereinafter, an embodiment of an apparatus (for example, a computing device, a computing system, or the like) for implementing a knowledge increasing method according to an embodiment of the present invention will be described in detail with reference to the drawings.

FIG. 1 is a block diagram of a computing device for implementing a knowledge increasing method according to an embodiment of the present invention.

Referring to FIG. 1, the knowledge increasing method according to an embodiment of the present invention may be implemented by a computing device 100, or may be programmed into a specific algorithm and recorded in a recording medium.

In the computing device 100, a specific algorithm and a recording medium storing the specific algorithm may be used as the term "AI agent". That is, an AI intelligence may be implemented as one of a software module, a hardware module, and a combination thereof.

The computing device 100 may include at least one processor 121, a data communication bus 122, a memory 123, a user input device 126, a user output device 127, and a storage 128. The elements described above may perform data communication therebetween through the data communication bus 122.

Moreover, the computing device 100 may further include a network interface 129 coupled to a network 130.

The processor 121 may be a central processing unit (CPU), or may be a semiconductor device which processes instructions in the memory 123 and/or the storage 128.

The processor 121 may perform data processing associated with increasing knowledge according to an embodiment of the present invention.

The processor 121 may perform, for example, data processing for calculating the uncertainty of knowledge, data processing for autonomously determining insufficient knowledge, data processing for autonomously sampling (generating) additional data for learning the determined insufficient knowledge, and data processing for performing learning on the insufficient knowledge on the basis of the sampled (generated) additional data.

In addition, the processor 121 may generate intermediate data generated in an intermediate data processing process and resultant data generated in a final data processing process and may transfer the intermediate data or the resultant data to at least one of the other elements 123, 126, 127, 128, and 129 through the data communication bus 122.

The intermediate data generated by the processor 121 may include, for example, an output value of each of all stages configuring a machine learning pipeline.

The memory 123 and the storage 128 may each include various types of volatile memories of non-volatile memories (or non-volatile storages). The memory 123 may include, for example, read only memory (ROM) 124 and random access memory (RAM) 125.

The storage 128 may store an AI agent 200 according to an embodiment of the present invention, which is programmed and executed by the processor 121.

The user input device 126 may include a key board and a mouse for inputting a user input value for increasing knowledge or for inputting user input data, and when the user input value or the user input data is sound data, the user input device 126 may include a microphone.

The user output device 127 may output the intermediate data or the resultant data generated by the processor 121 and may include a display device, and when the intermediate data or the resultant data is output in the form of sound data, the user output device 127 may include a speaker.

The network interface 129 may support a communication function for connecting the computing device 100 to a network, and the communication function may include a wired communication function and a wireless communication function.

The wireless communication function may include a function of supporting 3G communication, 4G communication, 5G communication, mobile communication, or wireless Internet communication.

A knowledge increasing method based on uncertainty of a neural network according to an embodiment of the present invention may be implemented as a method executable by the processor 121, and instructions executable by the processor 121 may process the knowledge increasing method based on uncertainty of a neural network according to an embodiment of the present invention.

The knowledge increasing method based on uncertainty of a neural network according to an embodiment of the present invention may be implemented as a computer-readable code in a recording medium.

A computer-readable recording medium may include all kinds of recording mediums which store data decodable by a computer. For example, the computer-readable recording medium may include ROM, RAM, a magnetic tape, a magnetic disk, flash memory, an optical data storage device, etc.

The computer-readable recording medium may be the storage 128 illustrated in FIG. 1, and in this case, the storage 128 may be an element which is freely detached or attached from or on the computing device 100, and for example, may include a universal serial bus (USB) memory and an external hard disk.

Moreover, the computer-readable recording medium may be distributed to a computer system connected to a computer communication network and may be stored and executed as a code executable by a distributed manner.

Hereinafter, in order to implement the knowledge increasing method based on uncertainty of a neural network according to an embodiment of the present invention, software modules or hardware modules executed by the processor 121 illustrated in FIG. 1 will be described in detail with reference to FIG. 2.

For reference, software modules for realizing the knowledge increasing method may be stored in the storage 128, and moreover, may be read based on a call instruction of the processor 121 and may be loaded into the memory 123. In this case, the memory 123 may provide an execution space for the software modules read by the processor 121.

Figure 2:
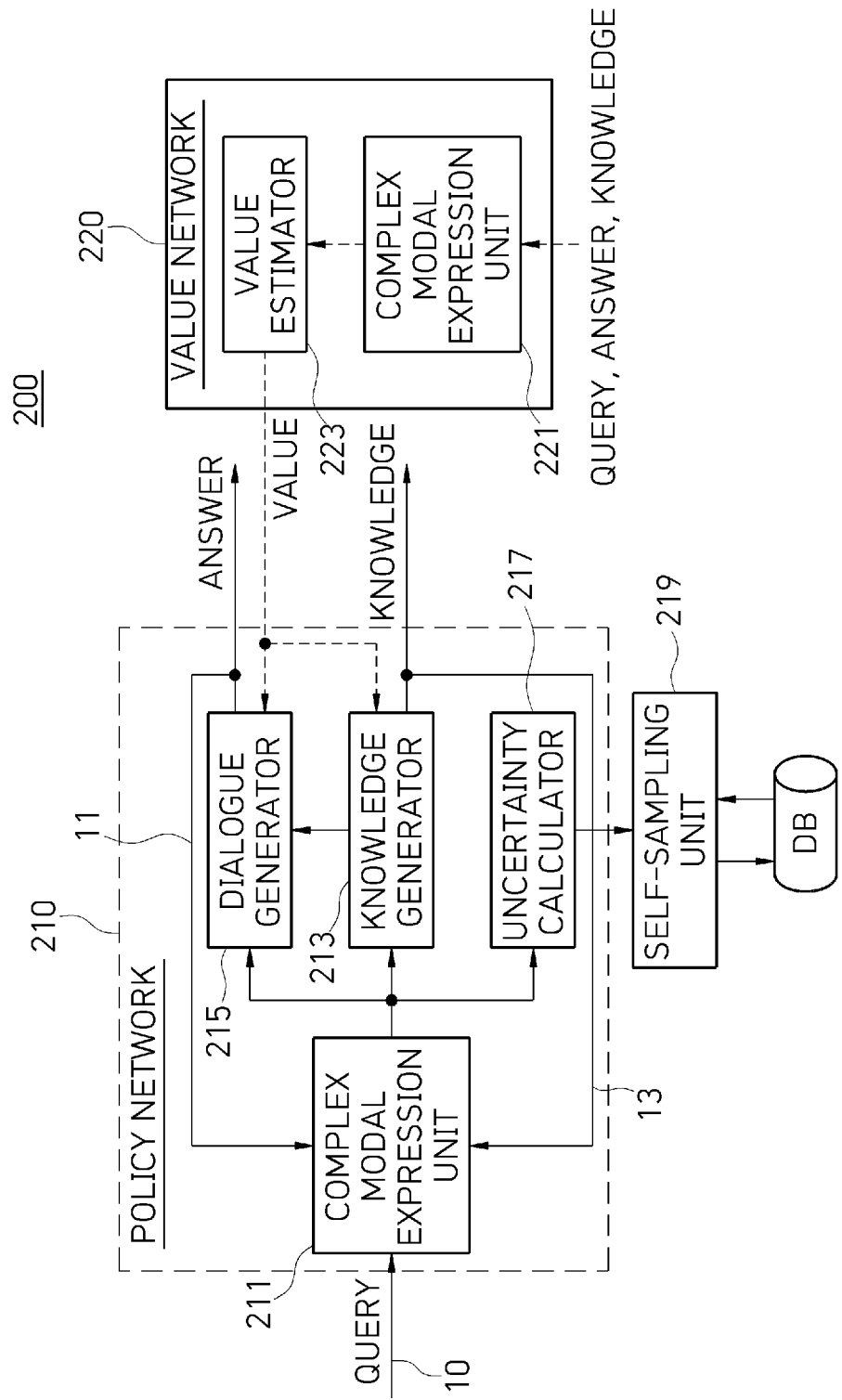
FIG. 2 is a block diagram of an AI agent programmed for implementing a knowledge increasing method according to an embodiment of the present invention.

FIG. 2 is a block diagram of an AI agent programmed for implementing a knowledge increasing method according to an embodiment of the present invention.

Referring to FIG. 2, the AI agent 200 programmed and executed by the computing device 100 or the processor 121 may be configured to include two artificial neural networks which include a policy network 210 and a value network 220.

Here, the policy network 210 may be referred to as a policy neural network, and the value network 220 may be referred to as a value neural network.

Each of the policy network 210 and the value network 220 may be configured to include a plurality of modules, and each of the plurality of modules may include a software module programmed into a neural network, a hardware module executing the software module, or a combination thereof.

The policy network 210 and the value network 220 may autonomously determine insufficient knowledge through cooperation and may increase knowledge by using additional data (learning data) of the insufficient knowledge.

Herein, a knowledge increasing method of increasing knowledge (hereinafter referred to as fashion coordination knowledge) associated with fashion coordination will be described.

The fashion coordination knowledge may be defined as knowledge for generating a combination of fashion items with a user demand reflected therein on the basis of a time, a place, or an occasion.

The kind of fashion item may be classified into items such as outerwear, jacket, underwear, and shoes on the basis of a worn position.

As illustrated in FIG. 2, the policy network 210 may include a complex modal expression unit 211, a knowledge generator 213, a dialogue generator 215, an uncertainty calculator 217, and a self-sampling unit 219.

The elements 211, 213, 215, 217, and 219 included in the policy network 210 may be implemented with a software module programmed into a neural network, a hardware module executing the software module, or a combination thereof.

The value network 220 may include the complex modal expression unit 221 and a value estimator 223. In this case, the elements 221 and 223 included in the value network 220 may be implemented with a software module programmed into a neural network, a hardware module executing the software module, or a combination thereof.

The AI agent according to an embodiment of the present invention may perform end-to-end learning on the basis of a back propagation algorithm.

In order to perform the end-to-end learning, the elements 213, 215, 217, and 219 other than the complex modal expression unit 211 and 221 may be expressed as a differentiable equation.

A neural network of a single layer may be expressed as an equation "$y=f(Ax+b)$". Here, x may denote an input, y may denote an output, f may denote a nonlinear function, and A and b may denote variables representing a learning target.

A neural network of a multilayer may be a neural network where neural networks of single layers are continuously connected to one another. For example, neural networks of two layers may be expressed as an equation "$y'=f'(A'y+b') =f'(A'f(Ax+b)+b')$".

In this case, a differentiation value of an equation representing a neural network may be needed for allowing an element expressed as a neural network to perform learning by using the back propagation algorithm. Therefore, the elements 213, 215, 217, 219, and 223 may be expressed as a differentiable equation.

Complex Modal Expression Unit (Data Preprocessing Unit) 211

The complex modal expression unit 211 may be a neural network (or a neural network model) which respectively converts user query data 10 (hereinafter referred to as a query), knowledge data 13 (hereinafter referred to as previously generated knowledge) previously generated by the knowledge generator in association with the query 10, and previously generated answer data 11 (hereinafter referred to as a previously generated answer), generated by the dialogue generator 215 on the basis of the previously generated knowledge 13, into specific-dimensional vector data. Here, the vector data may be a numerical value (or a real-number vector value).

The query 10 may be data including a language, an image, or a combination thereof and may be input through a user input device (126 of FIG. 1).

The previously generated answer 11 may be fed back from an output of the dialogue generator 215, and the previously generated knowledge 13 may be fed back form an output of the knowledge generator 213.

An embedding algorithm or a word embedding algorithm may be used for converting 'the query 10', 'the previously generated answer 11', and 'the previously generated knowledge 13' into specific-dimensional vectors.

The word embedding algorithm may be a method of digitizing a word constituting a text, and for example, may be Word2Vec or fastText of Facebook.

A word included in each of 'the query 10', 'the previously generated answer 11', and 'the previously generated knowledge 13' may be converted into a real-number vector value on the basis of a processing process based on the word embedding algorithm.

The real-number vector value may be referred to as a language embedding vector (or a language embedding vector value).

The complex modal expression unit 211 may concatenate and average vector values of words (normalize bag of words) to calculate (output) a language embedding vector (or a language embedding vector value).

The complex modal expression unit 211 may extract an image attribute of a fashion item by using a neural network trained on a previously built DeepFashion database.

The complex modal expression unit 211 may calculate a language embedding vector of the extracted image attribute and may obtain the calculated language embedding vector as an image embedding vector (or an image embedding vector value).

The image attribute of the fashion item may include, for example, at least one of a shape (form) feature, a material feature, a color feature, and a sensitivity feature.

An embedding vector described below may be used as the term including at least one of a language embedding vector and an image embedding vector.

In FIG. 3, an example of the query 10, the previously generated answer 11, and the previously generated knowledge 13 each associated with fashion coordination knowledge input to the complex modal expression unit 211 is illustrated.

The previously generated answer 11 of FIG. 3 may be a query-type answer where an AI agent (or the dialogue generator 215), which has determined the insufficiency of information, requires additional information.

In FIG. 4, an example of embedding vectors 40, 41, and 43 obtained by respectively performing embedding on the query 10, the previously generated answer 11, and the previously generated knowledge 13 of FIG. 3 is illustrated. Knowledge Generator 213 (Knowledge Generating Neural Network)

The knowledge generator 213 may be a neural network (or a neural network model) which generates knowledge by using, as an input, an embedding vector (or an embedding vector value) input from the complex modal expression unit 211.

The knowledge generator 213 may include, for example, a neural network using an explicit memory and may generate fashion coordination knowledge suitable for a new demand of a user and time, place, and occasion (TPO).

The explicit memory may include a long-term memory and a short-term memory. The long-term memory and the short-term memory may be the terms which are widely used in the machine learning field, and their descriptions are omitted.

Figure 5:
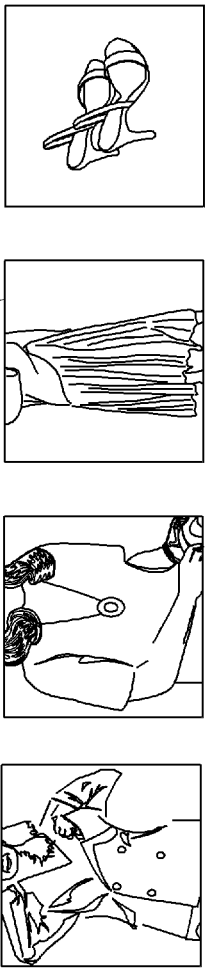
FIG. 5 is a diagram illustrating an example of an answer (the answer explaining the fashion coordination) generated by a dialogue generator of FIG. 2 and fashion coordination knowledge generated by a knowledge generator of FIG. 2 on the basis of a new demand and time, place, and occasion (TPO).

An example of the fashion coordination knowledge, as illustrated in FIG. 5, may include an image 50 including a pleated skirt having a bright color.

Figure 6:
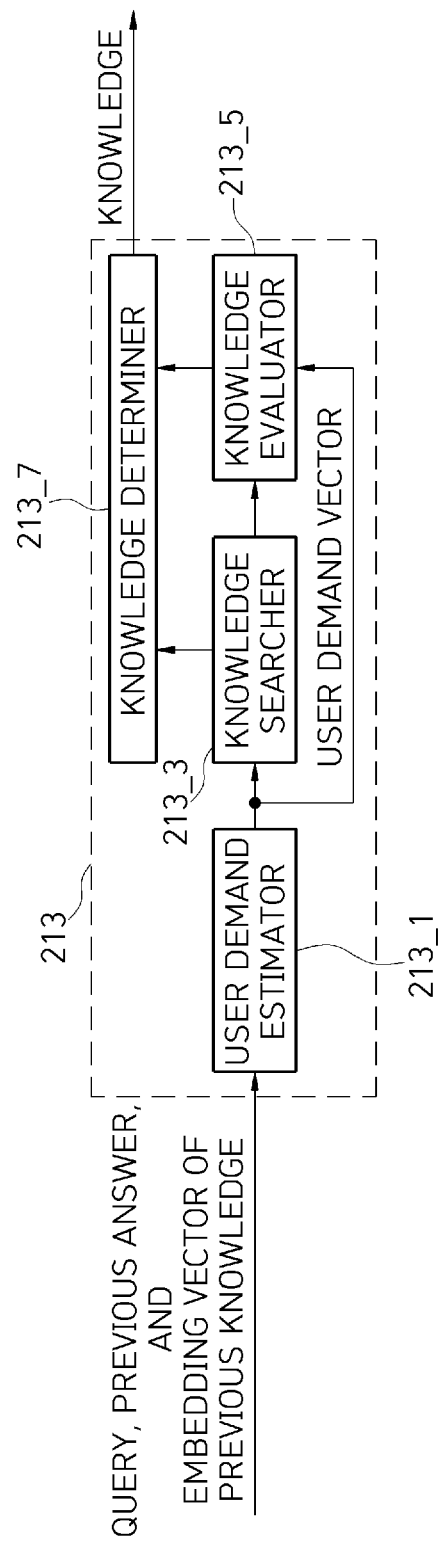
FIG. 6 is a block diagram illustrating an internal configuration of the knowledge generator illustrated in FIG. 2.

FIG. 6 is a block diagram illustrating an internal configuration of the knowledge generator illustrated in FIG. 2.

Referring to FIG. 6, the knowledge generator 213 may include a user demand estimator 213_1, a knowledge searcher 213_3, a knowledge evaluator 213_5, and a knowledge determiner 213_7.

The user demand estimator 213_1 may have a neural network structure using an explicit memory and may estimate a user demand for an embedding vector input from the complex modal expression unit 211 on the basis of the neural network structure.

The user demand estimator 213_1 may estimate, for example, a vector including an additional (new) user demand which requires a previous user demand and a bright-color pleated skirt style (50 of FIG. 5).

The knowledge searcher 213_3 may search for knowledge suitable for a vector input from the user demand estimator 213_1.

In order to search for knowledge, the knowledge searcher 213_3 may have, for example, a neural structure using a long-term memory (LTM).

That is, the knowledge searcher 213_3 may search for new knowledge corresponding to (suitable for) a vector (hereinafter referred to as a user demand vector) representing a user demand by using the LTM.

The LTM may store an embedding vector of a previously constructed declarative knowledge. For example, metadata of fashion items may be stored in the LTM.

Moreover, the knowledge searcher 213_3 may calculate a probability value of the fashion items stored in the LTM by using a matching network.

Here, the probability value of the fashion items may denote a probability that specific knowledge matches a user demand matter.

The knowledge searcher 213_3 may calculate a similarity between a user demand vector (a user demand matter) and knowledge by using the matching network, and then, may apply the similarity to a softmax function to calculate the probability value of the fashion items.

Because the matching network is used, the knowledge searcher 213_3 may be a neural network model based on a matching network algorithm.

The knowledge evaluator 213_5 may be a neural network which receives, as an input, the user demand vector from the user demand estimator 213_1 and the found new knowledge (including previously generated knowledge) from the knowledge searcher 213_3 and evaluates the found new knowledge.

The knowledge evaluator 213_5, for example, may replace a fashion item which is to be searched for by a user and may evaluate the degree to which newly constructed fashion coordination knowledge matches the user demand vector including a new user demand.

In order to perform such evaluation, the knowledge evaluator 213_5 may include a neural network structure based on a relation network (RN) algorithm.

An RN may be a neural network model for inferring a relationship between objects and has been described in detail in the paper "A simple neural network module for relational reasoning". Therefore, a description of a method of evaluating the degree to which newly constructed fashion coordination knowledge matches a user demand vector is omitted.

The knowledge determiner 213_7 may be a neural network model which determines knowledge by using knowledge found by the knowledge searcher 213_3 and an evaluation result evaluated by the knowledge evaluator 213_5.

The knowledge determiner 213_7 may multiply a probability value of fashion items, input from the knowledge searcher 213_3, by an evaluation result value of fashion coordination input from the knowledge evaluator 213_5 and may determine a fashion item, corresponding to a maximum value of calculated results, as fashion coordination knowledge.

For example, when a variable of each of fashion items is 'x', a probability value of fashion items found by the knowledge searcher 213_3 on the basis of a user demand matter is '$p_1(x)$', and an evaluation result value of fashion coordination calculated by the knowledge evaluator 213_5 is '$p_2(x)$', determining the fashion coordination may be a process of selecting 'x' which enables '$p_1(x)*p_2(x)$' to be the maximum.

Dialogue Generator 215 (Dialogue Generating Neural Network)

Referring again to FIG. 2, the dialogue generator 215 may be a neural network (a neural network model) which requests additional information for constructing knowledge or generates an answer explaining new knowledge, by using knowledge input from the knowledge generator 213 and an embedding vector input from the complex modal expression unit 211.

The dialogue generator 215 may generate an answer 52 which explains fashion coordination knowledge as in FIG. 5.

The dialogue generator 215 may include, for example, a long short-term memory (LSTM) recurrent neural network or a self-attention-based sequence-to-sequence neural network.

Value Estimator 223 (Value Estimation Neural Network)

The value estimator 223 included in the value network 220 may estimate a value parameter of a current state by using knowledge generated by the knowledge generator 213, an answer (or a dialogue) generated by the dialogue generator 215, and an embedding vector value input from the complex modal expression unit 221.

Here, the current state may denote an output state of the policy network 210, and for example, may include an answer output from the dialogue generator 215 and knowledge output from the knowledge generator.

A value may denote the accuracy and user satisfaction of each of knowledge and an answer.

A value may be used as a compensation parameter for allowing the knowledge generator 213 and the dialogue generator 215 to be trained through reinforcement learning. For example, a training method may use an actor-critic algorithm.

The complex modal expression unit 221 included in the value network 220 may have the same configuration and function as those of the complex modal expression unit 211 included in the policy network.

Uncertainty Calculator 217

The uncertainty calculator 217 may include a neural network (or a neural network model) which calculates the uncertainty of an output of the knowledge generating model (the knowledge generator 213) by using, as an input, at least one of an embedding vector (a query) input from the complex modal expression unit 211, a previously generated answer, and previously generated knowledge.

Uncertainty may be a scalar value which is obtained by measuring the randomness of a probability variable.

Uncertainty may include the uncertainty of the knowledge generating model (a neural network configuring the knowledge generator 213) and the uncertainty of observation.

The uncertainty of the knowledge generating model (the knowledge generator 213) may denote uncertainty associated with an error occurring in a process of modeling data. That is, the uncertainty of the knowledge generating model (the knowledge generator 213) may denote uncertainty which occurs due to an incomplete model. The uncertainty of the knowledge generating model (the knowledge generator 213) may be called 'epistemic uncertainty' in the machine learning field.

The uncertainty of observation may denote uncertainty which occurs due to noise of data like sensor noise and motion noise. The uncertainty of observation may be called 'aleatoric uncertainty' in the machine learning field.

Figure 7:
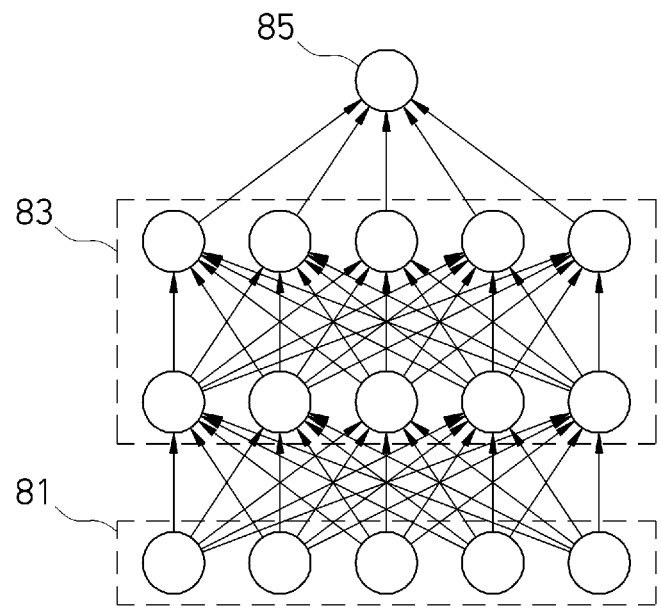
FIG. 7 is a diagram for describing a dropout technique used to calculate uncertainty according to an embodiment of the present invention.
Figure 7:
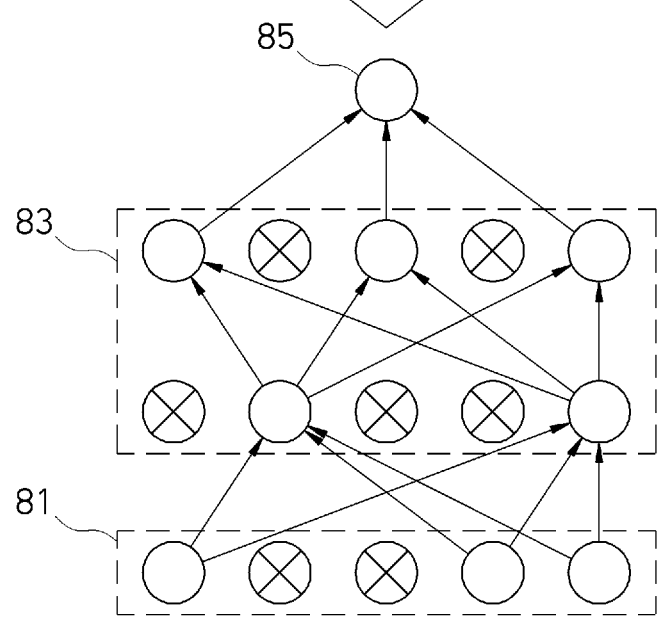

FIG. 7 is a diagram for describing a dropout technique used to calculate uncertainty by using the uncertainty calculator illustrated in FIG. 1.

Referring to FIG. 7, the uncertainty calculator 217 may calculate uncertainty (value) on the basis of an average and a variance of outputs of the knowledge generating model (the knowledge generator 213) with dropout applied thereto.

The dropout technique may be a technique which drops out some neurons of an input layer 81 or a hidden layer 83 included in a neural network layer and performs learning by using the dropout neural network.

A neural network structure before the dropout technique is applied is illustrated in a left region of FIG. 7, and a neural network structure after the dropout technique is applied is illustrated in a right region of FIG. 7.

As illustrated in the right region of FIG. 7, in a neural network layer with the dropout technique applied thereto, some neurons (some nodes) included in the input layer 81 or the hidden layer 83 and a connection for transferring an output of each of the some neurons (the some nodes) to other neurons may be omitted.

In a neural network layer illustrated in the right region of FIG. 7, circles where 'X' are marked may denote omitted neurons.

When some neurons of the input layer 81 or the hidden layer 83 are omitted (deleted) through various combinations, a plurality of final output values corresponding to the number of combinations may be obtained through an output layer 85.

For example, when the number of outputs of the hidden layer 83 is 10, one final output value may be obtained from the output layer 85 by omitting (deleting) a first neuron (a node) and a fifth neuron, another final output value may be obtained from the output layer 85 by omitting (deleting) a second neuron (a node) and a fourth neuron (a node), and another final output value may be obtained from the output layer 85 by omitting (deleting) a neuron connection corresponding to No. 8 and No. 9 neurons. In this manner, a plurality of final output values may be obtained through the output layer 85.

The uncertainty calculator 217 may calculate an average $\hat{m}_{w^\wedge}(x_t)$ and a variance $\hat{\sigma}_{w^\wedge}(x_t)$ of the plurality of final output values obtained from a neural network layer with dropout applied thereto and may calculate the uncertainty of the knowledge generating model by using a calculation result value of the calculation.

A calculation operation performed by the uncertainty calculator 217 will be mathematically described below.

A neural network with dropout applied thereto may calculate the average $\hat{m}_{w^\wedge}(x_t)$ and the variance $\hat{\sigma}_{w^\wedge}(x_t)$ as an output on the basis of an input associated with the input layer 81.

The epistemic uncertainty (model uncertainty) of the knowledge generating model (the knowledge generator) may be calculated as expressed in the following Equation 1.

$$\text{model\_uncertainty} = \frac{1}{T}\sum_{t=1}^{T} \hat{m}_{\hat{w}}(x_t)^2 - \left(\sum_{t=1}^{T} \hat{m}_{\hat{w}}(x_t)\right)^2 \quad \text{[Equation 1]}$$

Here, T may denote the total number of methods of deleting some neurons in a neural network with dropout applied thereto. For example, T may denote the total number of combinations of connecting some neurons included in the hidden layer 83 in the neural network layer.

The aleatoric uncertainty (observation uncertainty) of observation among uncertainties calculated by the uncertainty calculator 217 may be calculated by using a variance output from a neural network with the dropout technique applied thereto.

When a variance (or a standard deviation) of a neural network with $t^{th}$ dropout applied thereto is $\hat{\sigma}_{w}(x_t)$, based on an input associated with the input layer 81, the aleatoric uncertainty of the observation may be calculated as expressed in the following Equation 2.

$$\text{observation\_uncertainty} = \frac{1}{T}\sum_{t=1}^{T} \hat{\sigma}_{\hat{w}}(x_t)^2 \quad \text{[Equation 2]}$$

Total_uncertainty indicating the inaccuracy of an output may be a sum of uncertainty calculated based on Equation 1 and uncertainty calculated based on Equation 2 and may be calculated as expressed in the following Equation 3.

$$\text{total\_uncertainty} = \quad \text{[Equation 3]}$$
$$\frac{1}{T}\sum_{t=1}^{T} \hat{m}_{\hat{w}}(x_t)^2 - \left(\sum_{t=1}^{T} \hat{m}_{\hat{w}}(x_t)\right)^2 + \frac{1}{T}\sum_{t=1}^{T} \hat{\sigma}_{\hat{w}}(x_t)^2$$

In addition, model uncertainty may be calculated by using a particle filter and conditional random fields (CRF) technique.

Self-Sampling Unit 219

Referring again to FIG. 2, the self-sampling unit 219 may include a neural network (or a neural network model) which self-determines the insufficiency of knowledge by using an uncertainty value calculated by the uncertainty calculator 217 described above, and then, samples new data.

For example, when an uncertainty value is greater than a predetermined threshold value, the self-sampling unit 219 may determine the insufficiency of knowledge. This may denote that a user has requested dress, matching a specific meeting, from the AI agent 200 but there is no fashion coordination knowledge about the request.

When sufficient knowledge (unknown knowledge) is checked, the self-sampling unit 210 may sample information, associated with a user demand vector, in the database (DB) 230 previously built through unsupervised learning, thereby generating learning data.

The generated learning data may be used as data for allowing the knowledge generator 213, the dialogue generator 215, and the value estimator 223 to perform learning, and the self-increase in knowledge may be achieved by the learning. In this case, learning may be supervised learning.

As another example, like AlphaGo and Atari game, data sampling may be performed by a method of searching for a new search space in reinforcement learning.

In a case where data is sampled based on reinforcement learning, when uncertainty is greater than a threshold value, the self-sampling unit 219 may determine the unknowingness of an action corresponding to a current state and may search for a new search space so as to obtain a result of an action corresponding to another state.

The self-sampling unit 219 may perform linear conversion on the uncertainty value calculated by the uncertainty calculator 217 in addition to an external compensation value based on feedback of the user, thereby calculating an internal compensation value.

The embedding vector may be used as a query value of the database 230 built through unsupervised learning. In order to use the embedding vector as the query value, the self-sampling unit 219 may perform an operation of converting the internal embedding vector into the query value on the basis of a schema structure of the database 230.

The self-sampling unit 219 may perform a search operation on a new space (for example, a database built through unsupervised learning) by using the embedding vector as the query value on the basis of the uncertainty value.

For example, when a state is $s_t$ and an action is $a_t$, the self-sampling unit 219 may perform linear conversion on the uncertainty value calculated based on Equation 3 to calculate an internal compensation value ($r_t^i$). The internal compensation value ($r_t^i$) may be calculated by the following Equation 4.

$$r_t^i = \alpha\left(\frac{1}{T}\sum_{t=1}^{T}\hat{a}_{\hat{w}}(s_t)^2 - \left(\sum_{t=1}^{T}\hat{a}_{\hat{w}}(s_t)\right)^2 + \frac{1}{T}\sum_{t=1}^{T}\hat{\sigma}_{\hat{w}}(s_t)^2\right) + \beta \quad \text{[Equation 4]}$$

Here, α and β may be parameters trained through learning.

The internal compensation value may be used as a value for searching for a new search space.

For example, in reinforcement learning, a new search space may be searched for based on a large internal compensation value. In unsupervised learning, sampling may be first performed on data having a large internal compensation value, or a number of samplings may be performed thereon. That is, in unsupervised learning, learning data having the calculated compensation value may be obtained from the database by using the embedding vector value as the query value.

Figure 8:
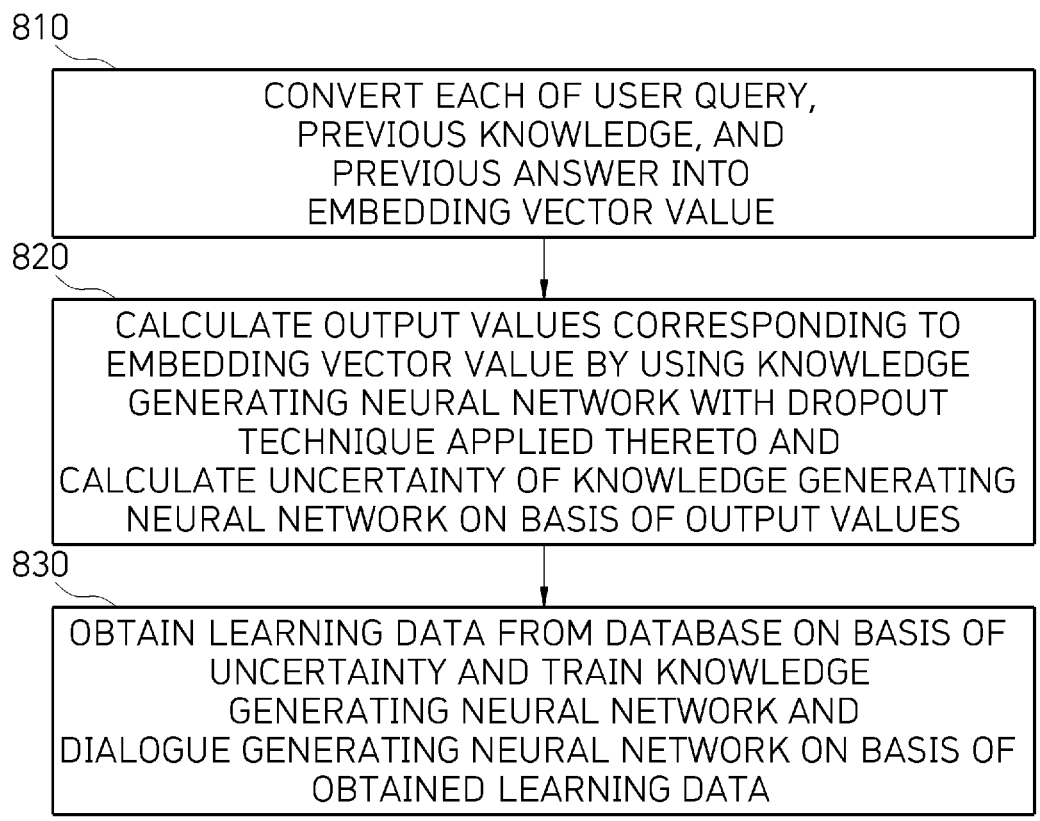
FIG. 8 is a flowchart for describing a knowledge increasing method of an AI agent performed by a computing device, according to an embodiment of the present invention.

FIG. 8 is a flowchart for describing a knowledge increasing method of an AI agent performed by a computing device, according to an embodiment of the present invention.

Referring to FIG. 8, the knowledge increasing method of the AI agent according to an embodiment of the present invention may be performed by, for example, the computing device illustrated in FIG. 1.

In order to increase knowledge of the AI agent 200, the computing device 100 may include the processor 121, the memory 123, and the storage 128.

The AI agent 200 may be a program which is programmed to include knowledge generating neural network for generating knowledge about a user query and a dialogue generating neural network for generating an answer to the user query on the basis of the knowledge, and the AI agent 200 may be stored in the storage 128.

The knowledge generating neural network may be the knowledge generator 213 illustrated in FIG. 2, and the dialogue generating neural network may denote the dialogue generator 215 illustrated in FIG. 2. The processor 121 may read the AI agent 200 stored in the storage 128, load the AI agent 200 into the memory 123, and execute the AI agent 200 loaded into the memory 123.

In order to increase knowledge, the AI agent 200 may be programmed to further include the complex modal expression unit 211, the uncertainty calculator 217, and the self-sampling unit 219. The complex modal expression unit 211 may be referred to as the term 'data preprocessing unit'.

In describing the following steps of the knowledge increasing method, descriptions which are the same as or similar to descriptions given above with reference to FIGS. 1 to 7 will be briefly given below or are omitted.

First, in step 810, a process of converting each of a current user query, previous knowledge generated by the knowledge generating neural network, and a previous answer, generated by the dialogue generating neural network, into an embedding vector value having a specific dimension may be performed by using the complex modal expression unit 211.

The current user query may be data including a language, an image, or a combination thereof. An embedding algorithm or a word embedding algorithm may be used for converting the current user query, 'the previous answer, and the previous knowledge into specific-dimensional embedding vector values.

Subsequently, in step 820, a process of calculating (obtaining) a plurality of output values corresponding to the embedding vector value by using the knowledge generating neural network with the dropout technique applied thereto and calculating the uncertainty of the knowledge generating neural network on the basis of the calculated (obtained) plurality of output values may be performed by the uncertainty calculator 217.

Here, the uncertainty of the knowledge generating neural network may include epistemic uncertainty, which occurs in a process of modeling data, and aleatoric uncertainty which occurs due to noise of the data.

Subsequently, in step 830, the self-sampling unit 230 may perform a process of searching for a database on the basis of the calculated uncertainty to obtain learning data and training the knowledge generating neural network and the dialogue generating neural network on the basis of the obtained learning data to increase knowledge. Here, the database may be a database built through unsupervised learning.

Step 830 may further include a process of training the value estimation neural network 223 on the basis of the generated learning data. The value estimation neural network 223 may generate a parameter for training the knowledge generating neural network and the dialogue generating neural network through reinforcement learning on the basis of knowledge generated by the knowledge generating neural network and the accuracy of an answer generated by the dialogue generating neural network.

Figure 9:
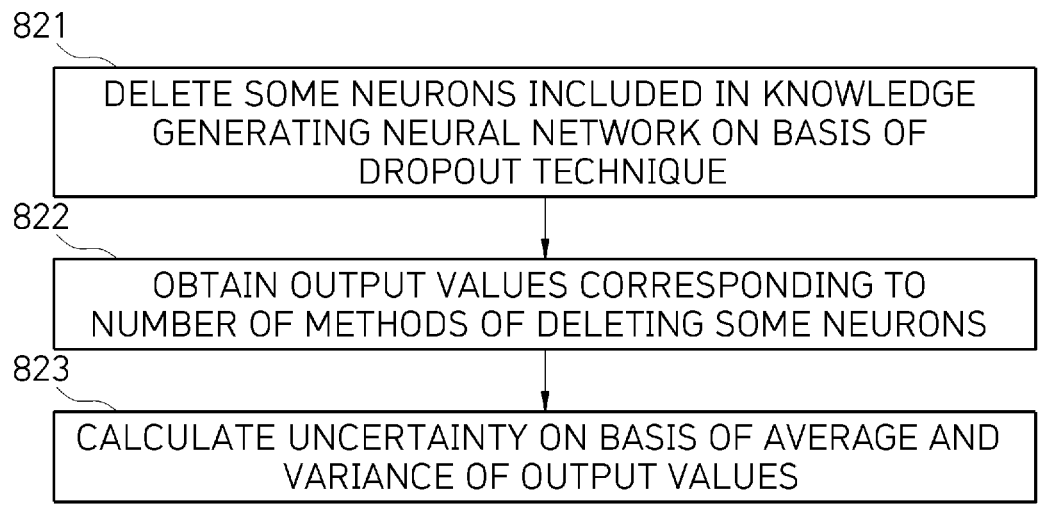
FIG. 9 is a flowchart describing an example of a detailed process of step 820 illustrated in FIG. 8.

FIG. 9 is a flowchart describing an example of a detailed process of step 820 illustrated in FIG. 8.

Referring to FIG. 9, in order to calculate uncertainty, first, in step 821, a process of deleting some neurons included in the knowledge generating neural network on the basis of the dropout technique may be performed. Here, the deleted some neurons may be some neurons included in the input layer or the hidden layer of the knowledge generating neural network.

Subsequently, in step 822, a process of obtaining the plurality of output values, corresponding to the number of methods of deleting the some neurons, from the knowledge generating neural network 213 may be performed.

Subsequently, in step 823, a process of calculating the uncertainty on the basis of an average and a variance of the plurality of output values may be performed. The uncertainty may be calculated based on Equations 1 to 3 described above.

Figure 10:
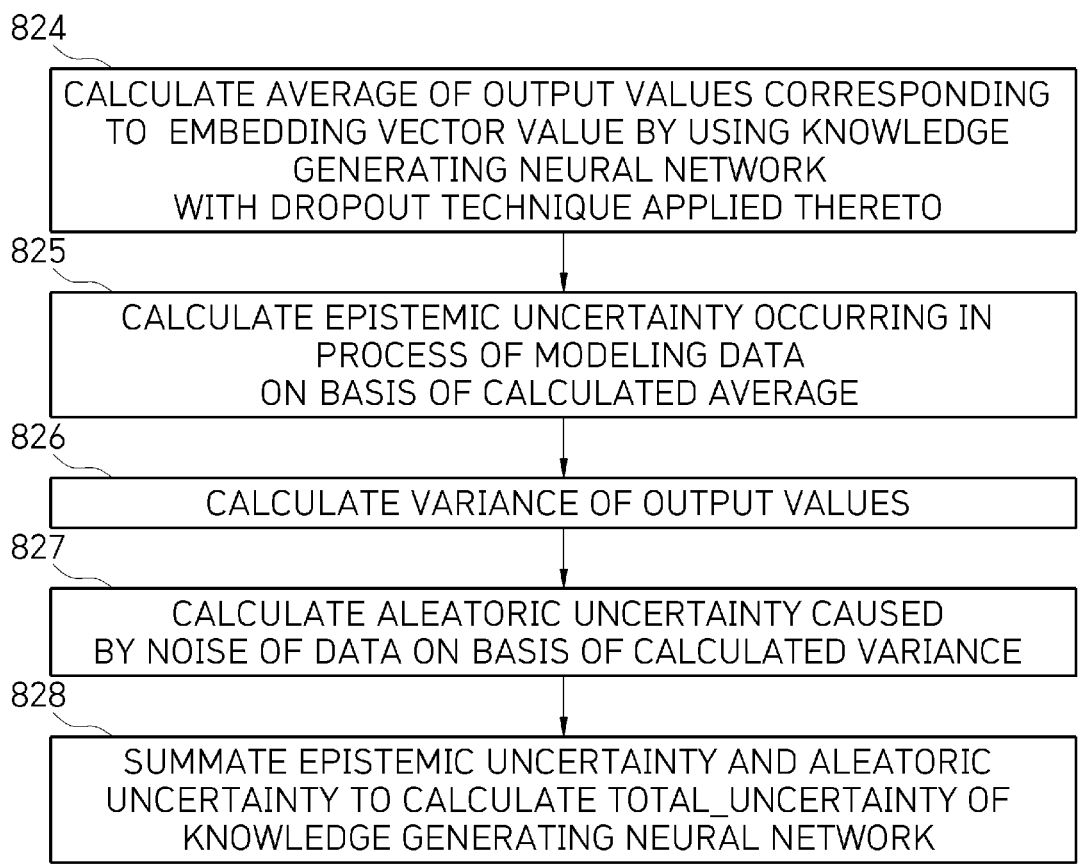
FIG. 10 is a flowchart describing another example of a detailed process of step 820 illustrated in FIG. 8.

FIG. 10 is a flowchart describing another example of a detailed process of step 820 illustrated in FIG. 8.

Referring to FIG. 10, first, in step 824, a process of calculating an average of the plurality of output values corresponding to the embedding vector value by using the knowledge generating neural network with the dropout technique applied thereto may be performed.

Subsequently, in step 825, a process of calculating epistemic uncertainty occurring in a process of modeling data on the basis of the calculated average may be performed. Here, the epistemic uncertainty may be calculated based on Equation 1 described above.

Subsequently, in step 826, a process of calculating a variance of the plurality of output values may be performed.

Subsequently, in step 827, a process of calculating aleatoric uncertainty caused by noise of the data on the basis of the calculated variance may be performed. Here, the aleatoric uncertainty may be calculated based on Equation 2 described above.

Subsequently, in step 828, a process of summating the epistemic uncertainty and the aleatoric uncertainty to calculate total_uncertainty of the knowledge generating neural network may be performed. Here, the total_uncertainty of the knowledge generating neural network may be calculated based on Equation 3 described above.

Figure 11:
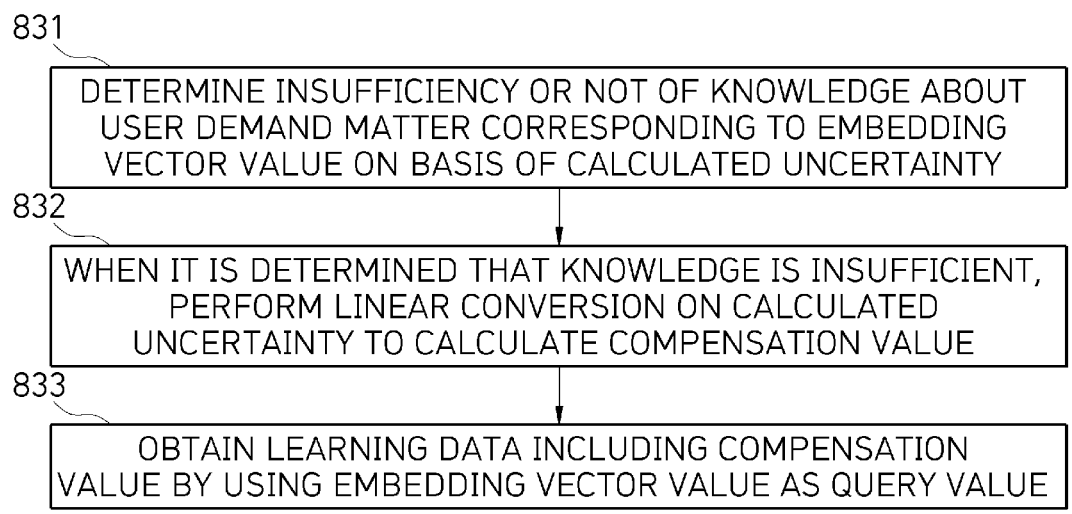
FIG. 11 is a flowchart describing a detailed process of step 830 illustrated in FIG. 8.

FIG. 11 is a flowchart describing a detailed process of step 830 illustrated in FIG. 8.

Referring to FIG. 11, in step 831, a process of determining the insufficiency or not of the knowledge about a user demand matter corresponding to the embedding vector value on the basis of the calculated uncertainty may be performed.

In step 832, when it is determined that the knowledge is insufficient, a process of performing linear conversion on the calculated uncertainty to calculate a compensation value may be performed. Here, the compensation value may be calculated based on Equation 4 described above.

In step 833, learning data including the compensation value may be obtained from the database by using the embedding vector value as a query value. Here, step 833 may further include a process of converting the embedding vector value into a query value on the basis of a schema structure of the database.

The obtained learning data may be used as data for training the knowledge generating neural network 213, the dialogue generating neural network 215, and the value estimation neural network 223, and thus, knowledge may autonomously increase.

As described above, the present invention may determine unknown knowledge on the basis of the uncertainty of a neural network and may learn additional data to increase knowledge. Also, the present invention may secure AI source technology which receives feedback of a user requesting various targets to self-determine the need for new knowledge, and thus, autonomously increases new knowledge. Accordingly, the present invention may be usefully applied to high-quality intelligence service markets which autonomously grows through self-learning in various application domains such as law, medicine, education, and fashion.

Moreover, the present invention may determine insufficient knowledge on the basis of the uncertainty of a neural network and may learn additional data to increase knowledge, and thus, may secure AI source technology which self-determines the need for new knowledge and autonomously learns new knowledge.

Therefore, the present invention may be usefully applied to high-quality intelligence service markets which autonomously grows through self-learning in various application domains such as law, medicine, education, and fashion.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of increasing knowledge based on uncertainty of a neural network in an artificial intelligence (AI) agent, programmed and executed by a computing device to include a knowledge generating neural network for generating knowledge about a user query and a dialogue generating neural network for generating an answer to the user query on the basis of the knowledge, the method comprising:
    converting each of a current user query, previous knowledge generated by the knowledge generating neural network, and a previous answer, generated by the dialogue generating neural network, into an embedding vector value having a specific dimension;
    calculating a plurality of output values corresponding to the embedding vector value by using the knowledge generating neural network with a dropout technique applied thereto and calculating uncertainty of the knowledge generating neural network on the basis of the calculated plurality of output values; and
    performing linear conversion on the calculated uncertainty to calculate a compensation value, obtain learning data having the calculated compensation value from a database built through unsupervised learning, and training the knowledge generating neural network and the dialogue generating neural network on the basis of the obtained learning data to increase knowledge.

2. The method of claim 1, wherein the calculating of the uncertainty comprises:
    deleting some neurons included in the knowledge generating neural network on the basis of the dropout technique;
    obtaining the plurality of output values, corresponding to number of methods of deleting the some neurons, from the knowledge generating neural network; and
    calculating the uncertainty on the basis of an average and a variance of the plurality of output values.

3. The method of claim 1, wherein the calculating of the uncertainty comprises calculating uncertainty, occurring in a process of modeling data, and uncertainty occurring due to noise of the data.

4. The method of claim 1, wherein the calculating of the uncertainty comprises:
    calculating an average of the plurality of output values corresponding to the embedding vector value by using the knowledge generating neural network with the dropout technique applied thereto;
    calculating first uncertainty occurring in a process of modeling data on the basis of the calculated average;
    calculating a variance of the plurality of output values;
    calculating second uncertainty caused by noise of the data on the basis of the calculated variance; and
    summating the first uncertainty and the second uncertainty to calculate uncertainty of the knowledge generating neural network.

5. The method of claim 1, wherein the increasing of the knowledge comprises:
    determining the insufficiency or not of the knowledge about a user demand matter corresponding to the embedding vector value on the basis of the calculated uncertainty; and
    when it is determined that the knowledge is insufficient, searching for the database to obtain the learning data.

6. The method of claim 5, wherein the determining of the insufficiency or not of the knowledge comprises comparing the calculated uncertainty with a predetermined threshold value to determine the insufficiency or not of the knowledge on the basis of a result of the comparison.

7. The method of claim 5, wherein the generating of the learning data comprises:
    performing linear conversion on the calculated uncertainty to calculate a compensation value; and
    obtaining learning data including the calculated compensation value from the database by using the embedding vector value as a query value.

8. The method of claim 1, wherein the increasing of the knowledge comprises training the knowledge generating neural network and the dialogue generating neural network through unsupervised learning.

9. The method of claim 1, wherein
    the AI agent further comprises a value estimation neural network programmed to generate a parameter for training the knowledge generating neural network and the dialogue generating neural network through reinforcement learning on the basis of the knowledge and an accuracy of the answer, and
    the increasing of the knowledge comprises further training the value estimation neural network on the basis of the generated learning data.

10. A knowledge increasing apparatus comprising:
    a storage configured to store an artificial intelligence (AI) agent programmed to include a knowledge generating neural network for generating knowledge about a user query and a dialogue generating neural network for generating an answer to the user query on the basis of the knowledge; and
    a processor configured to execute the AI agent stored in the storage,
    wherein the AI agent comprises:
    a preprocessor that converts each of a current user query, previous knowledge generated by the knowledge generating neural network, and a previous answer, generated by the dialogue generating neural network, into an embedding vector value having a specific dimension;
    a calculator that calculates a plurality of output values corresponding to the embedding vector value by using the knowledge generating neural network with a dropout technique applied thereto and to calculate uncertainty of the knowledge generating neural network on the basis of the calculated plurality of output values; and
    a sampler that linearly converts on the calculated uncertainty to calculate a compensation value, obtain learning data having the calculated compensation value from a database built through unsupervised learning, and train the knowledge generating neural network and the dialogue generating neural network on the basis of the obtained learning data to increase knowledge.

11. The knowledge increasing apparatus of claim 10, wherein the calculator calculates first uncertainty occurring in a process of modeling data on the basis of an average of the plurality of output values, calculates second uncertainty caused by noise of the data on the basis of a variance of the plurality of output values, and summates the first uncertainty and the second uncertainty to calculate uncertainty of an output of the knowledge generating neural network.

12. The knowledge increasing apparatus of claim 10, wherein the sampler compares the calculated uncertainty with a predetermined threshold value to determine the insufficiency or not of the knowledge on the basis of a result of the comparison, and when it is determined that the knowledge is insufficient, searches for the database to obtain the learning data.

13. The knowledge increasing apparatus of claim 10, wherein the sampler obtains the learning data corresponding to insufficient knowledge from the database by using the embedding vector value as a query value.

14. The knowledge increasing apparatus of claim 10, wherein the sampler trains the knowledge generating neural network and the dialogue generating neural network through unsupervised learning to increase knowledge.

15. The knowledge increasing apparatus of claim 10, wherein
- the AI agent further comprises a value estimation neural network programmed to generate a parameter for training the knowledge generating neural network and the dialogue generating neural network through reinforcement learning on the basis of the knowledge and an accuracy of the answer, and
- the sampler further trains the value estimation neural network on the basis of the generated learning data.

* * * * *